United States Patent [19]
Wada et al.

[11] Patent Number: 6,116,016
[45] Date of Patent: Sep. 12, 2000

[54] GAS TURBINE APPARATUS USING FUEL CONTAINING VANADIUM

[75] Inventors: Kunihiko Wada, Kawasaki; Seiichi Suenaga, Yokohama; Kazuhiro Yasuda, Yokohama; Hiroki Inagaki, Yokohama; Masako Nakahashi, Tokyo; Atsuhiko Izumi; Tetsuzou Sakamoto, both of Yokohama, all of Japan

[73] Assignee: Kabushiki Kaisha Toshiba, Kawasaki, Japan

[21] Appl. No.: 09/005,508

[22] Filed: Jan. 12, 1998

[51] Int. Cl.[7] .................................................. F02C 3/20
[52] U.S. Cl. .................................... 60/39.17; 60/39.461
[58] Field of Search ............................... 60/39.17, 39.33, 60/39.461

[56] References Cited

U.S. PATENT DOCUMENTS

| | | | |
|---|---|---|---|
| 2,631,929 | 3/1953 | Thorpe et al. | 60/39.461 |
| 2,968,148 | 1/1961 | Rocchini et al. | 60/39.461 |
| 5,561,977 | 10/1996 | Harada et al. | 60/39.461 |

Primary Examiner—Louis J. Casaregola
Attorney, Agent, or Firm—Finnegan, Henderson, Farabow, Garrett & Dunner, L.L.P.

[57] ABSTRACT

A gas turbine apparatus having a plurality of stages of rotor.stator blade and utilizing fuel containing 0.5 ppm or more of vanadium. A plurality of stages of the rotor.stator blade have a stage which is driven by combustion gas not including vanadium corrosion suppressing agent and a stage which is driven by combustion gas including vanadium corrosion suppressing agent and is controlled in its combustion gas temperature at below 1,458 K. In addition, the plurality of stages of the gas turbine are supplied with different kinds of combustion gases according to the temperature of each stage. Or, by disposing at least two systems of fuel supplying mechanism to one combustion chamber, the combustion temperature is controlled according to the kinds and the mixing ratio of the fuels. Therewith, while suppressing corrosion of high temperature member due to V and S, the deposition of the reaction products due to the vanadium corrosion suppressing agent and the like can be suppressed. Thereby, the system availability ratio can be improved and long life of the gas turbine can be realized. Further, due to high combustion gas temperature, efficiency can be enhanced.

6 Claims, 10 Drawing Sheets

OPERATING PATTERN

GAS TURBINE APPARATUS USING FUEL CONTAINING VANADIUM

BACKGROUND OF THE INVENTION

1. Field of the Invention

This invention relates to gas turbine apparatus for electric power generation, in particular relates to gas turbine apparatus which can uses low quality oil such as heavy oil, residue oil and the like, or coal as fuel.

2. Description of the Prior Arts

These days, from the point of view of fuel resources and environment problems, diversification of the fuels for high temperature apparatus such as a gas turbine and the like is aggressively promoted. Since, among various fuels, so-called low quality oil such as heavy oil, residue oil which is left at the final stage of petroleum refining process, or orimulsion and the like is limited in their usage, a large quantity of them is left unused. Thus, they are not expensive in their cost and expected inevitably to increase in their supply amount as demand for high quality oil such as lamp oil increases in future. From the above circumstances, the low quality oils are expected to be alternative for high quality oils such as LNG, lamp oil, light oil, and the like.

In FIG. 19, an example of a structure of a conventional heavy oil fired gas turbine system is shown. Air taken in through an air inlet 1, after being compressed by an air compressor 2, is mixed/burned in a combustion chamber 3 with fuel supplied from a fuel tank 4. High temperature and high speed combustion gas generated by burning the fuel is sent to a gas turbine 5 which possesses a plurality of stages of a combination of a turbine rotor blade and a turbine stator blade (hereinafter referred to as rotor.stator blade).

The above described combustion gas is at first transferred to the first stage 5a of the rotor.stator blade and the energy of the combustion gas is transformed into a rotation movement of the turbine rotor blade. Further, the combustion gas, by sequentially going through the second stage 5b, the third stage 5c of the rotor.stator blade, drives the turbine rotor blade of each stage. The rotation torque obtained by each turbine rotor blade is transmitted to an electric generator 6, the electric generator driven thereby. These principal structures are common for all general type gas turbine systems including heavy oil, LNG, and lamp oil fired one.

Now, since, in the low quantity oil (heavy oil, lamp oil and so on), impurities such as V, Na, K, Pb, S and the like are included much in quantity, corrosion of the high temperature member by these impurities is serious. Therefore, when the low quality oil is used, pretreatment of the fuel is indispensable. For the heavy oil fired gas turbine system, a mechanism 7 for pretreatment of the fuel is accompanied.

In FIG. 20, an example of the construction of the fuel pretreatment mechanism 7 for the conventional heavy oil fired gas turbine system is shown. The heavy oil supplied from a fuel tank 4 and pure water supplied from a tank 8 are mixed and centrifuged with a centrifugal machine 9, thereby water soluble corrosive elements such as Na, K, and the like are eliminated. Among the erosive elements, since V is not easily soluble in water, the centrifugal method with water can not eliminate V. Therefore, when the fuel is transferred to the gas turbine 5 through a fuel transferring pump 10, V corrosion suppressing agent is added from a corrosion suppressing agent tank 11. With addition of the V corrosion suppressing agent, the V corrosion of the high temperature member of the gas turbine 5 is aimed to be reduced. As the V corrosion suppressing agents, a mixture of Mg compound such as $MgSO_4$ or Si compound with water or solvent can be used.

However, in the above described conventional gas turbine system, at the stage such as the first stage 5a of the gas turbine 5 which is exposed to high temperature combustion gas, reaction products such as $MgSO_4$, $Mg_3V_2O_8$, MgO and the like are heavily deposited on the blade portion, where the reaction products are formed between the Mg added as the V corrosion suppressing agent and elements included in the combustion gas atmosphere. This causes output power decrease due to the decrease of area of gas flow path and material deterioration accompanying temperature rise due to narrowing of the cooling hole.

To remedy these problems, by adding solid particles in the combustion gas, the deposited reaction products on the blade are mechanically removed. Or, when the system is stopped running, chemical cleaning with water or chemicals is executed. In FIG. 21, a representative structure of wet cleaning apparatus is shown. This apparatus is equipped with a mechanism for cleaning the inside of the combustion chamber 3 or the gas turbine 5 by sending in the pure water from the pure water tank 12 through a pump 13. However, such frequent cleanings of the gas turbine lead to lowering of availability ratio of the gas turbine system. Even if the above described cleaning procedure is executed, basically it is required to prevent the reaction products from precipitating. Therefore, presently, the inlet temperature of the gas turbine is limited only at the lower temperature side.

Further, in the case of a gas turbine system which uses the fuels such as the low quality oil, coal, and the like, problem is sulphidizing corrosion due to sulfur included in the fuel is pointed out. That is, due to the reaction between sulfur and Ni and the like included in the superalloy which constitutes the base material of the high temperature member, the reaction products are formed. Since the melting points of the compounds are low, liquid phase due to sulfide is formed at the tip end of corrosion. This selectively corrodes grain boundary and make rapidly lower the strength of the base material. The protective oxide film formed on the surface of the superalloy loses the protective effect when melted salt such as $Na_2SO_4$ and the like which are deposited on its surface are dissolved. Thereby, rapid lowering of the strength of the base material occurs. To prevent sulphidizing corrosion, although prevention of corrosion is conventionally executed by employing high Cr superalloy corrosion resistant coating, sufficient preventive effect can not be obtained.

As described above, in the conventional gas turbine apparatus, gas obtained by burning the fuel, in which the V corrosion suppressing agent is added, is directly sent into the gas turbine. Around the first stage of the rotor.stator blade which temperature becomes high, the reaction products (ash content) mainly consisting of Mg which is included particularly in the V corrosion suppressing agent precipitate, thereby causes narrowing of the path of gas flow to result in lowering of the output power or causes closing of the cooling holes to result in serious deterioration of materials. The deposition of the reaction products due to the V corrosion suppressing agent restricts the temperature range where the gas turbine can be operated. This prevents the gas turbine from operating efficiently at turbine inlet temperature of, for example, 1,473 K or more. Further, when such fuel as the low quality oil or coal both abundant in sulfur content is used, there appears the sulphidizing corrosion at the rotor.stator blade of the gas turbine due to the sulfur. This is one factor determining the life of the gas turbine.

From above explained reasons, in the conventional gas turbine apparatus, it is a subject to, while suppressing the corrosion of the high temperature member due to V, suppress the deposition of the reaction products due to the V corrosion suppressing agent. Further, it is also a subject to suppress the corrosion of the high temperature member due to sulfur. Thus, it is required, by remedying these, to improve the system availability ratio and to realize long life of the gas turbine, further to improve efficiency due to utilization of higher temperature of the fuel gas.

SUMMARY OF THE INVENTION

Therefore, one object of the present invention is to, when highly corrosive fuels such as the low quality oil or coal are employed, while suppressing the corrosion of the high temperature member, improve the availability ratio and realize longer life. In addition, it is aimed to enable to operate at higher temperature of the combustion gas to improve the efficiency of the gas turbine. Another object of the present invention is to, while improving the thermal efficiency and economy under broader operating conditions of the gas turbine system, improve the life and reliability of the gas turbine which uses the low quality oil.

Gas turbine apparatus of the present invention enables to remedy the above described problems by improving the usage of the highly corrosive fuels such as the low quality oil or coal and adding method of the V corrosion suppressing agent.

That is, the first gas turbine apparatus of the present invention comprises fuel containing V or 0.5 ppm or more, a combustion chamber in which the fuel and compressed air are introduced and the fuel is burned, a mechanism projecting the corrosion suppressing agent which suppresses the corrosion due to V in the fuel or the combustion gas of the fuel, and a gas turbine possessing a plurality stages of rotor.stator blade which are made to rotate by the combustion gas, wherein at least one stage of the rotor.stator blade being driven by the combustion gas not including the corrosion suppressing agent and at least one stage of the rotor.stator blade being driven by the combustion gas including the corrosion suppressing agent.

In the first gas turbine apparatus, the rotor.stator blade which is driven by the combustion gas not including the corrosion suppressing agent is disposed upstream the combustion gas flow than, for example, the rotor.stator blade driven by the combustion gas including the corrosion suppressing agent. The first gas turbine apparatus, further, comprises a high temperature reactor which is disposed between the rotor.stator blade driven by the combustion gas not including the corrosion suppressing agent and the rotor.stator blade driven by the combustion gas including the corrosion suppressing agent, and promotes reaction between the combustion gas and the corrosion suppressing agent. The first gas turbine apparatus, still further, comprises a reheater disposed between the stages of a plurality of stages of rotor.stator blade, the corrosion suppressing agent being injected there in the fuel containing 0.5 ppm or more of the V to be used at the reheater.

In FIG. 1, relationship between various corrosion phenomena vs temperature. The vanadium (V) corrosion which is the problem when the low quality oil is used peaks in the temperature range of from 673 to 873 K. Below this temperature, since the corrosive reaction products mainly consisting of vanadium oxides do not form liquid phase, corrosiveness decreases. On the contrary, when the temperature becomes higher than the above temperature range, since viscosity of the corrosive reaction products decreases, deposition thereof decreases. Thus, the corrosiveness also decreases. Since the temperature of the first stage of the rotor.stator blade which is remarkable in the deposition of ash content on the blade portion, the deposition mainly consisting of the vanadium suppressing agent, is beyond the above temperature range, the vanadium corrosion itself is rather less problematic.

The first turbine apparatus of the present invention is provided with the stage driven by the combustion gas not including the vanadium corrosion suppressing agent and the stage driven by the combustion gas including the vanadium corrosion suppressing agent. Therefore, prior to the stage of the high temperature remarkable in deposition of the ash content due to the vanadium corrosion suppressing agent, injection of the vanadium corrosion suppressing agent is avoided, and, immediately before the stage of the temperature range remarkable in the vanadium corrosion, the vanadium corrosion suppressing agent can be projected. Thereby, while suppressing the deposition of the ash content due to the vanadium corrosion suppressing agent, the vanadium corrosion of the high temperature member can be prevented.

In addition, when the combustion gas including the vanadium corrosion suppressing agent is exposed to the temperature range of 1,458 K or more, 1,458 K being the melting point of $MgSO_4$ which is a main component of the ash content due to the vanadium corrosion suppressing agent, the ash content forms the liquid phase to precipitate solidly on the surface of the blade portion and the like. Therefore, the temperature of the stage driven by the combustion gas including the vanadium corrosion suppressing agent is preferable to be set below 1,458 K.

If the temperature of the combustion gas at the stage of injection of the vanadium corrosion suppressing agent is too low, reactivity between the vanadium corrosion suppressing agent and vanadium in the combustion gas becomes less noticeable, and the effect of the vanadium corrosion suppressing agent is reduced. In order to avoid such a problem, it is preferable to dispose a high temperature reactor to accelerate the reaction between the combustion gas and the vanadium corrosion suppressing agent. The high temperature reactor, after sufficient reaction between the vanadium in the combustion gas and the corrosion suppressing agent, injects the combustion gas into the lower temperature side of the gas turbine stages (rotor.stator blade).

In a reheater cycle type gas turbine system where a combustion chamber is disposed also between the stages of the gas turbine, it is preferable to project the vanadium corrosion suppressing agent only to the fuel for the reheater. Thereby, vanadium in the combustion gas undergone the stage driven by the combustion gas not including the vanadium corrosion suppressing agent and in the fuel used in the reheater and the vanadium corrosion suppressing agent can be made to react effectively.

In addition, by maintaining the gas temperature of the stage downstream the reheater below the melting temperature (1,458 K) of $MgSO_4$ which is a main component of the ash content due to the vanadium corrosion suppressing agent, the temperature of the combustion gas at the stage prior to them, even when the low quality oil is used as a fuel, can be set at 1,458 K or more. That is, construction of a gas turbine apparatus capable of being operated at higher temperature than the conventional one can be made possible, and improvement of the thermal efficiency of the gas turbine apparatus can be attained.

The second gas turbine apparatus of the present invention comprises a combustion chamber wherein compressed air and the fuel are introduced and the fuel is burned, a gas turbine possessing a plurality of stages of rotor.stator blade which are rotated by the combustion gas of the fuel, and a mechanism supplying a plurality of kinds of combustion gas to the plurality of stages of the rotor.stator blade according to the combustion temperature of each stage.

The second gas turbine apparatus, since multiple kinds of combustion gas are employed considering the temperature of each stage of the gas turbine, while avoiding the peak temperatures of various corrosion phenomena shown in FIG. 1, can be constructed highly efficient.

The sulphidizing corrosion phenomena which is a problem when the fuel including high concentration of sulfur such as coal is used possesses it peak of corrosion quantity around 1,073 K as evident from FIG. 1. Different from the problem of the deposition of the vanadium corrosion suppressing agent, since the temperature of the high temperature member itself is the problem, material temperature of gas turbine stage using the combustion gas including relatively large amount of sulfur is controlled at less than 1,073 K.

And, for the high temperature stage of the gas turbine, the combustion gas containing 100 ppm or less of sulfur oxide ($SO_x$) is used and the material temperature is set at 1,073 K or more. For the low temperature stage where the material temperature is less than 1,073 K, the combustion gas containing the sulfur oxide ($SO_x$) of exceeding 100 ppm is used. With such a management, in addition that the highly corrosive combustion gas is used and the cost of the fuel is reduced, while avoiding the sulphidizing corrosion of the high temperature member, a highly efficient gas turbine system can be constructed.

The third gas turbine apparatus of the present invention comprises the first stage of the combustion chamber where the compressed air and the fuel are introduced and the fuel is burned, a gas turbine possessing a plurality of stages of the rotor.stator blade which are rotated by the combustion gas of the fuel, a reheater disposed between the stages of the plurality of the stages of the rotor.stator blade, and a mechanism supplying different kind of fuels according to temperature of the rotor.stator blades after the combustion chamber.

In the third gas turbine equipment, for the first stage of the combustion chamber and the reheater, different kinds of fuels are used considering the stage temperature of the gas turbine after each combustion chamber. Thus, while avoiding the peak temperatures of various corrosion phenomena shown in FIG. 1, a gas turbine system excellent in its efficiency can be constructed.

For example, the first stage of the combustion chamber is provided with the fuel containing less than 0.5 ppm of V, and a reheater where the stage temperatures of the gas turbine thereafter become less than 1,458 K is provided with the fuel containing 0.5 ppm or more of V mixed with the vanadium corrosion suppressing agent. Or, the first stage of the combustion chamber is provided with the fuel containing 1.5 weight % or less of sulfur, and a reheater where the material temperatures of the gas turbine stages thereafter become less than 1,073 K is provided with the fuel or coal containing 1.5 weight % or more of sulfur. Thereby, in addition to lowering of the fuel cost due to use of highly corrosive fuel, while avoiding the vanadium corrosion of the high temperature member, the thermal efficiency can be enhanced remarkably compared with the conventional gas turbine which uses the low quality oil.

The fourth gas turbine apparatus of the present invention comprises a compressed air, a combustion chamber where the compressed air compressed by the compressor and fuel are projected therein and the fuel is burned, a fuel supplying mechanism possessing two or more ways of fuel supplying system so as to supply a plurality of fuels to the combustion chamber, a gas turbine possessing the rotor.stator blades which are rotated by the combustion gas of the fuel, and a mechanism controlling the combustion temperature according to kinds and the mixing ratio of the fuels.

In the fourth gas turbine apparatus, for example, the combustion chambers are provided with the fuel containing less than 0.5 ppm of V and the fuel containing 0.5 ppm or more of V. The turbine inlet temperature is set at the temperature of 1,458 K or more for the fuel containing less than 0.5 ppm of V, and the turbine inlet temperature is set at the temperature of less than 1,458 K for the fuel containing 0.5 ppm or more of V. The compressor of the fourth gas turbine apparatus has variable stator blades and a mechanism regulating angles of the variable stator blades according to the kinds and mixing ratio of the fuels. The fourth gas turbine apparatus further has a mechanism regulating quantity of water or vapor being input into the combustion chamber according to the kinds or mixing ratio of the fuels and a mechanism regulating quantity of cooling air being input into the combustion chamber according to the kinds or mixing ratio of the fuels.

The fourth gas turbine apparatus realizes higher thermal efficiency by utilizing high temperature combustion gas of the less corrosive fuels such as lamp oil and LNG during high loading operation. Besides, by lowering the combustion temperature during low loading operation, the low quality oils such as heavy oil and residual oil can be used with out adversely affecting reliability of the gas turbine.

Further, by exposing the corrosive ash, which is deposited on the surface of the blades when the low quality oil is used, to rather higher temperature than the melting point of around 1,573 K of the ash during high loading operation, the melted corrosive ash is lowered in its viscosity to be removed from the surface of the blade. Or, by evaporating chlorine and chlorides in their high temperature state, which are known to accelerate the high temperature corrosion, into an atmosphere, proceeding of the high temperature corrosion can be retarded to elongate the life of the gas turbine blade. Therefore, according to the fourth gas turbine apparatus of the present invention, the optimum thermal efficiency for all operating conditions can be realized and a gas turbine system less expensive in its running cost can be constructed. Further, both of reliability and life can be remarkably improved compared with the conventional gas turbine employing the low quality oil.

More specifically, by raising the gas temperature at the turbine inlet up to 1,458 K or more during combustion mode of lamp oil and LNG, the gas turbine stage is driven by the high temperature combustion gas to realize high thermal efficiency. On the contrary, during the combustion mode of heavy oil and the residual oil, by controlling the gas temperature at the turbine inlet to the lower temperature than the melting temperature (1,458 K) of $MgSO_4$ which is a main component of the deposited ash content, deposition of the ash content can be avoided. By regulating the operating conditions considering this temperature as a criterion, the life and reliability of a gas turbine can be improved remarkably.

Further, when variable stator blades are disposed for regulating flow rate of air at the inlet of the compressor, for example, for the fuel containing 0.5 ppm or more of vanadium, by raising opening of the variable stator blades to increase the flow rate of air, the combustion temperature can be lowered and loading range capable of operating within combustion temperature limit can be made broad. On the contrary, for the fuel containing less than 0.5 ppm of vanadium, by lowering the opening of the variable stator blades to raise the combustion gas temperature, operation under high waste gas temperature is made possible.

When the fuel containing 0.5 ppm or more of vanadium is used, by regulating jet rate of water or vapor into the combustion chamber, the combustion gas temperature can be set appropriately. When operated with low quality oil, the combustion gas temperature is regulated to be less than 1,458 K. On the contrary, when operated with the high quality oil or LNG, the combustion gas temperature is raised. Or, by regulating also the cooling air volume introduced directly into the combustion chamber, the combustion gas temperature can be set appropriately. The variable stator blades and other combustion temperature regulating mechanism can be combined to be used.

DESCRIPTION OF THE PREFERRED EMBODIMENTS

Embodiments for implementing the present invention will be explained below with reference to the drawings.

Figure 2:
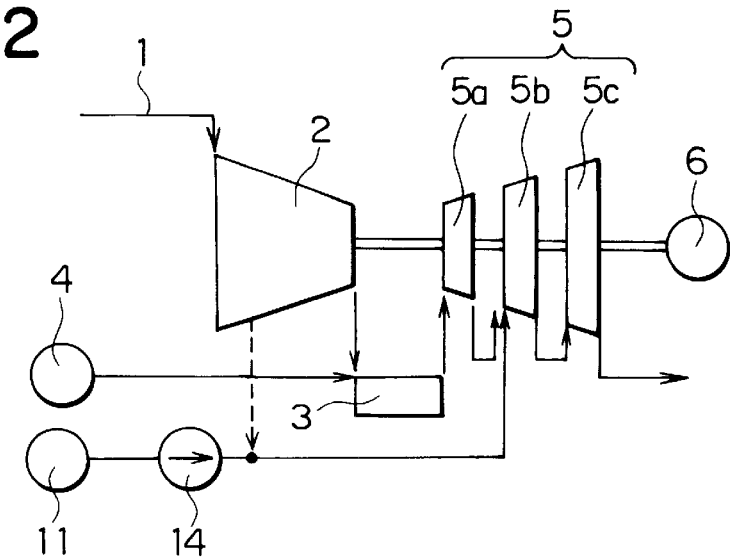
FIG. 2 is a diagram showing a construction of the first embodiment of the first gas turbine apparatus of the present invention.
Figure 19:
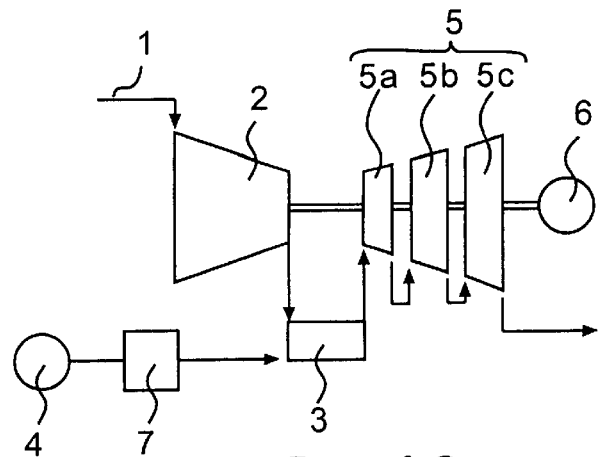
FIG. 19 is a diagram showing an example of the construction of the conventional heavy oil fired gas turbine apparatus.
Figure 20:
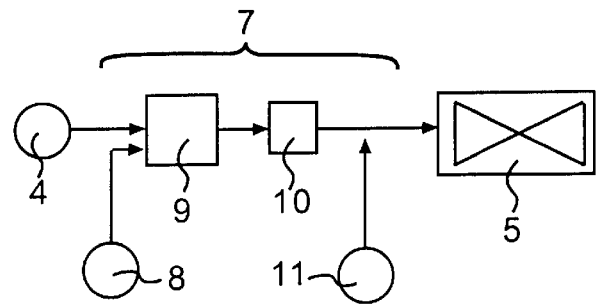
FIG. 20 is a diagram showing a construction of a fuel pre-treatment device for the conventional heavy oil fired gas turbine apparatus.
Figure 21:
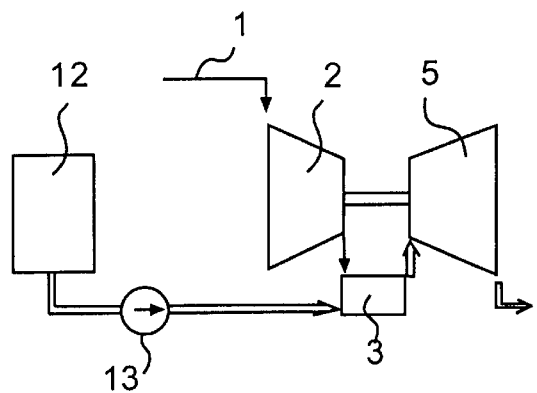
FIG. 21 is a diagram showing a construction of a cleaning device for the conventional heavy oil fired gas turbine apparatus.

FIG. 2 is a diagram showing a construction of the first embodiment of the first gas turbine apparatus of the present invention. Here, the identical portions as those of the convention gas turbine apparatus shown in FIG. 19 are shown with the identical numerals.

In the gas turbine apparatus shown in FIG. 2, the combustion chamber 3 is, in addition to supply of the air compressed by the compressor 2, provided directly from a combustion tank 4 with fuel (low quality oil fuel) consisting of low quality oil such as heavy oil, residual oil, orimulsion oil, and the like. Here, the low quality oil fuel means fuel consisting of low quality oil including 0.5 ppm or more of vanadium (V). The low quality oil fuel including 0.5 ppm or more of vanadium is usually required to be used with the vanadium corrosion suppressing agent to suppress the vanadium corrosion of the high temperature member.

Figure 1:
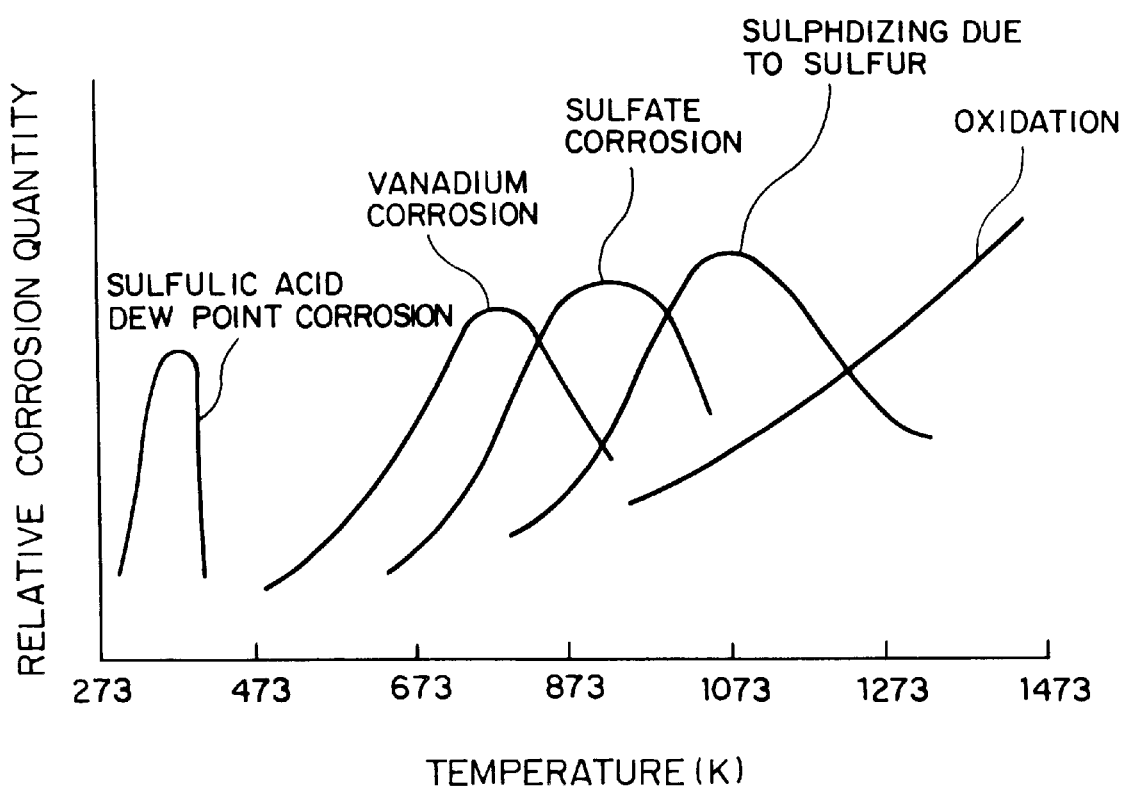
FIG. 1 is a diagram showing a relationship between various kinds of corrosion phenomena and temperature.

The low quality oil fuel supplied directly to the combustion chamber 3 is mixed with the compressed air at the combustion chamber 3 to be fired there. The V corrosion suppressing agent free combustion gas obtained by this combustion is at first sent to the first stage (the first rotor.stator blade) 5a of the gas turbine 5 having a plurality of stages of the rotor.stator blades. The first stage 5a of the gas turbine 5 is usually raised to the temperature of 1,473 K or more because of direct sending of the above described combustion gas. This temperature exceeds the temperature range where the vanadium corrosion is remarkable that is shown in FIG. 1. Therefore, even with the combustion gas of the low quality oil fuel not including the vanadium corrosion suppressing agent, there is no vanadium corrosion problem of the high temperature member consisting the rotor and the stator.

The combustion gas undergone the first stage 5a of the gas turbine 5 is sent to the second stage 5b of the rotor.stator blade. At the stages which exist after the second stage 5b of the rotor.stator blade and downstream the combustion gas flow, that is, at the second stage 5b and the third stage 5c, the combustion gas temperatures tend to go down to the critical temperature range where the vanadium corrosion become remarkable. Therefore, in the gas turbine apparatus of this embodiment, immediately before the second stage 5b, the vanadium corrosion suppressing agent is independently introduced into the combustion gas undergone the first stage 5a. The vanadium corrosion suppressing agent is introduced through a corrosion suppressing agent transferring pipe 14 from a corrosion suppressing agent tank 11. In addition, the corrosion suppressing agent can be introduced together with the compressed air extracted from the midway of the compressor 2. As the vanadium corrosion suppressing agent, as shown, for example, in the conventional technology, a mixture between Mg compounds such as $MgSO_4$ and the like and water can be employed.

When the temperature of the combustion gas including the vanadium corrosion suppressing agent become 1,458 K or more, 1,458 K being the melting point of $MgSO_4$ which is a main component of the ash content due to the vanadium corrosion suppressing agent, the ash content forms liquid phase to precipitate solidly on the surface of the high temperature member such as blade portion. Thus, the combustion gas temperatures of the gas turbine stages after being added the vanadium corrosion suppressing agent, that is, of the stages after the second stage 5b are preferable to be set at less than 1,458 K. The practical combustion gas temperature of the stage after the second stage 5b is preferable to be in the temperature range of from 1,373 to 1,173 K.

An electric generator 6 is driven by rotation torque obtained by each rotor blade of the first stage 5a driven by the combustion gas not including the vanadium corrosion suppressing agent and the second stage 5b and the third stage 5c both driven by the combustion gas including the vanadium corrosion suppressing agent.

Thus, at the first stage 5a, a high temperature stage, of the gas turbine 5, the combustion gas not including the vanadium corrosion suppressing agent is provided and, at the stages after the second stage 5b including the second stage where the temperature rise is not so large, the vanadium corrosion suppressing agent is projected. Together with the above projection, the combustion gas temperatures after the second stage 5b including the second stage where the vanadium corrosion suppressing agent is projected are set at the temperature of less than 1,458 K where the deposition of the ash due to the vanadium corrosion suppressing agent can be suppressed. Thereby, while preventing the deposition of the ash at the first stage 5a where the deposition of the ash due to the vanadium corrosion suppressing agent was until now remarkable, the vanadium corrosion at the second stage 5b and the third stage 5c is effectively suppressed. The vanadium corrosion of the high temperature member of the gas turbine 5 is suppressed to materialize longer life. Further, the cleaning interval for removing the ash content due to the vanadium corrosion suppressing agent can be made longer to reduce the maintenance cost. In addition, the availability ratio of the gas turbine apparatus can be enhanced.

Now, in the gas turbine apparatus shown in FIG. 2, a situation is explained where, immediately before the second stage 5b, the vanadium corrosion suppressing agent is projected. However, when the combustion gas temperature at the second stage 5b can be maintained at the temperature exceeding the temperature range where the vanadium corrosion is remarkable, immediately before the third stage 5c, the vanadium corrosion suppressing agent can be projected.

Figure 3:
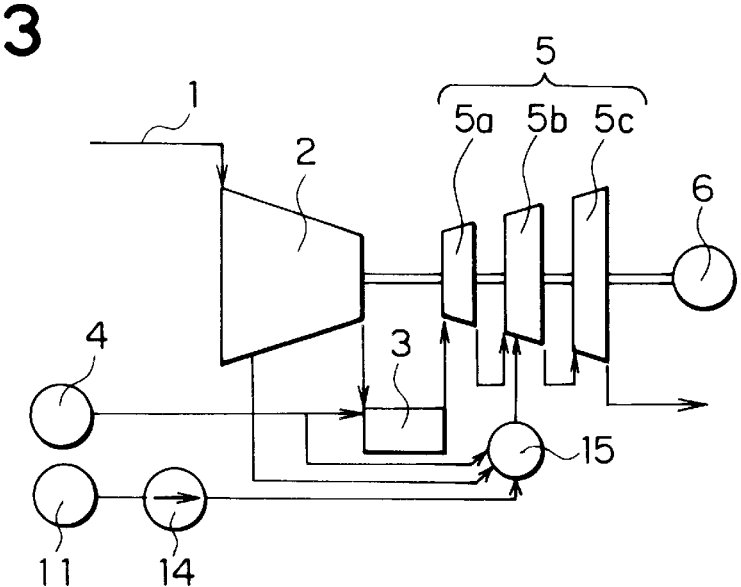
FIG. 3 is a diagram showing a construction of the second embodiment of the first gas turbine apparatus of the present invention.

The FIG. 3 is a diagram showing a construction of the second embodiment of the first gas turbine apparatus of the present invention. The gas turbine apparatus shown in FIG. 3 possesses a high temperature reactor 15 which accelerate the reaction between the combustion gas and the vanadium corrosion suppressing agent and is disposed between the first stage 5a and the second stage 5b of the gas turbine 5. Into the high temperature reactor 15, the compressed air extracted from the middle stage of the compressor 2, the low quality oil fuel from the fuel tank 11, and the vanadium corrosion suppressing agent from the corrosion suppressing tank 11 are provided. The high temperature reactor 15 mixes the vanadium corrosion suppressing agent with the fuel to further make them react at high temperature (combustion, for example). Then, the combustion gas fully reacted with the vanadium corrosion suppressing agent is introduced into the combustion gas undergone the first stage 5a which forms the main stream.

Thus, by disposing a high temperature reactor 15 between the stages of the gas turbine 5, the reaction between the vanadium corrosion suppressing agent and the V in the combustion gas can be promoted. Into the second stage 5b that is the afterstage, combustion gas enough weakened in corrosiveness due to V is introduced. Thereby, vanadium corrosion of the high temperature member after the second stage 5b of the gas turbine 5 is secured to be suppressed. The temperature of the combustion gas being sent to the second stage 5b from the high temperature reacter 15 should be kept at less than 1,458° K. as explained above.

The high temperature reactor 15 is not necessarily required to be kept at such a high temperature as that corresponding to the combustion of the low quality oil fuel. The reaction temperature at the high temperature reactor 15 can be set at any temperature which can promote the speedy reaction between the low quality oil fuel and the vanadium corrosion suppressing agent. Further, the combustion gas undergone the first stage 5a and the vanadium corrosion suppressing agent can be made to react directly at the high temperature reactor 15.

Figure 4:
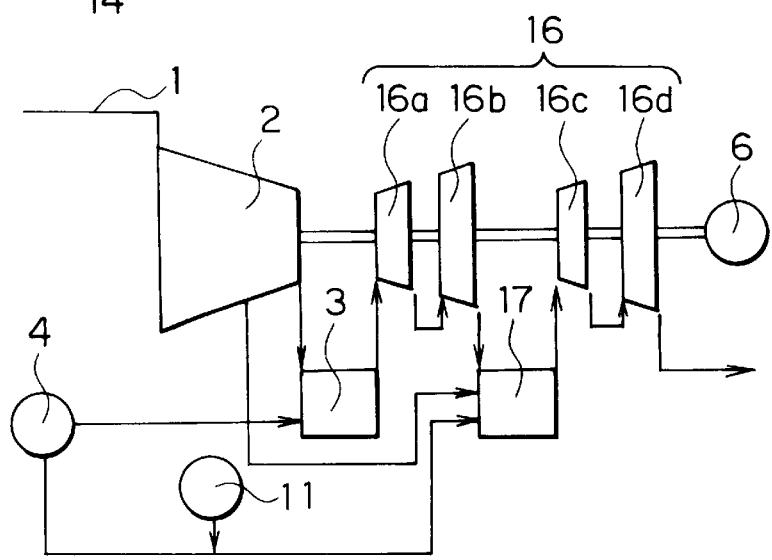
FIG. 4 is a diagram showing a construction of the third embodiment of the first gas turbine apparatus of the present invention.

FIG. 4 is a diagram showing the third embodiment of the first gas turbine apparatus of the present invention. The gas turbine apparatus shown in FIG. 4 has, in addition to the first stage of the combustion chamber 3 disposed preceding the first stage 16a of the gas turbine 16, the second stage of reheater 17 disposed between the stages of the gas turbine 16. This is a so-called reheat cycle type gas turbine apparatus. In this embodiment, the first and the second stage 16a, 16b of the gas turbine 16 are disposed downstream the first stage of the combustion chamber 3, and the reheater 17 is disposed between the second stage 16b and the third stage 16c. Downstream the reheater 17, the third and the fourth stage 16c, 16d are disposed.

Number of the stages of the gas turbine disposed downstream respective combustion chamber 3, 17 can be appropriately determined according to the specification of the system. In addition, number of the stage of the combustion chamber is not necessarily limited to two stages, still more combustion chambers can be disposed.

In the above described reheat cycle type gas turbine apparatus, as identical as the embodiment shown in FIG. 1, at first the combustion chamber 3 is directly provided with, in addition to the air compressed by the compressor 2, a part of the low quality oil fuel containing 0.5 ppm or more of V from the fuel tank 4. The combustion gas, which is obtained by combustion at the first stage of the combustion chamber 3 and does not include the vanadium corrosion suppressing agent, is sent to the first stage 16a of the gas turbine 16, then sent to the second stage 16b, thereby rotates each rotor blade of the first and the second stage 16a, 16b.

The combustion gas undergone the second stage 16b of the gas turbine is sent to the second stage of the reheater 17. The reheater 17 is provided with the low quality oil fuel (including 0.5 ppm or more of V), in which the vanadium corrosion suppressing agent is projected midway from the corrosion suppressing agent tank 11, from the fuel tank 4. The reheater 17 is further provided with compressed air drawn from the midway of the compressor 2 to fire the low quality oil fuel mixed with the vanadium corrosion suppressing agent there. The combustion gas including the vanadium corrosion suppressing agent is, after being joined with the combustion gas undergone the second stage 16b, sent to the third stage 16c that is the later stage,
then is sent to the fourth stage 16d, then, after making rotate each rotor blade of the third and the fourth stage 16c, 16d, is exhausted finally outside the system.

The combustion gas temperatures of the third and the fourth stage 16c, 16d, where the combustion gas including the vanadium corrosion suppressing agent are supplied, are set below the temperature of the melting point of $MgSO_4$ (1,458° K.), $MgSO_4$ being the main component of the ash content due to the vanadium corrosion suppressing agent as described above. Thus, by controlling the combustion gas temperature of the third and the fourth stage 16c, 16d to the temperature of less than 1,458° K. by the reheater 17, the deposition of the ash content due to the vanadium corrosion suppressing agent can be avoided. Besides, since the first and the second stage 16a, 16b preceding the reheater 17 are driven by the combustion gas not including the vanadium corrosion suppressing agent, the combustion gas temperature does not need to be regulated at less than 1,458° K. The temperature of the combustion gas being supplied to the first stage 16a from the combustion chamber 3 can be set at, for example, 1,473° K. or more where the thermal efficiency is high.

Thus, since the high temperature gas turbine stage efficient in the thermal efficiency can be used, energy can be extracted from the high temperature combustion gas which temperature is 1,458° K. or more and can not be obtained in the conventional heavy oil fired gas turbine apparatus. Thereby, in addition to the suppression of the corrosion effects shown in FIG. 1, the thermal efficiency of the gas turbine apparatus which uses the low quality oil can be drastically improved. As to longer life of the high temperature member used for the gas turbine 16, the longer time interval for cleaning the ash content due to the vanadium corrosion suppressing agent, reduction of the maintenance cost and improvement of the availability ratio of the gas turbine apparatus, the situation are identical with the gas turbine apparatus of the embodiment shown in FIG. 2.

Next, the embodiment of the other gas turbine apparatus of the present invention will be explained.

Figure 5:
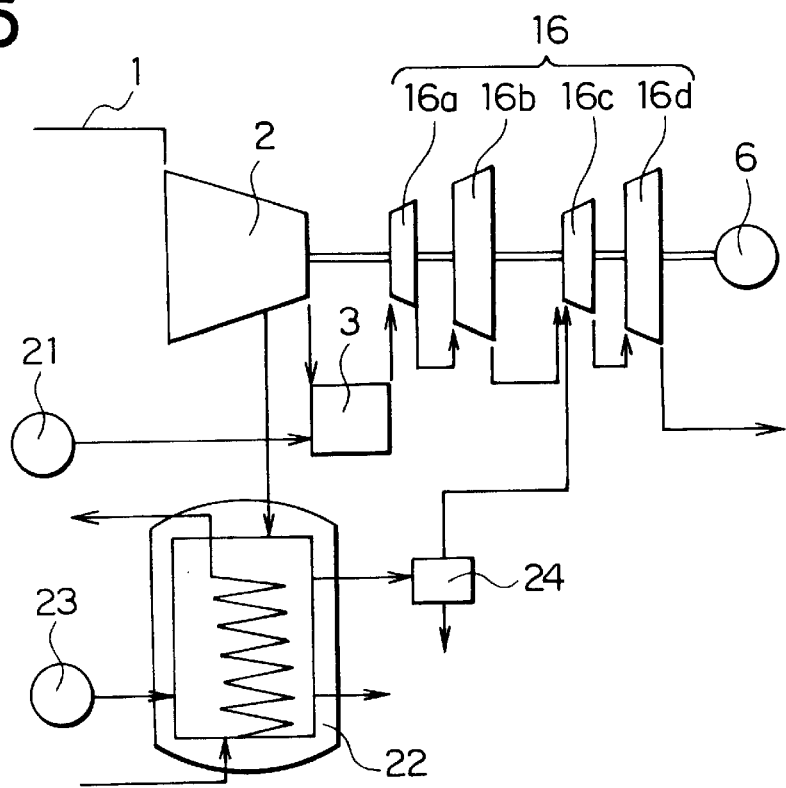
FIG. 5 is a diagram showing a construction of an embodiment of the second gas turbine apparatus of the present invention.

FIG. 5 is a diagram showing a construction of one embodiment of the second gas turbine of the present invention. The gas turbine apparatus shown in FIG. 5 shows an example of the construction where the present invention is applied in a coal fired electric power generation using a pressurized fluidized bed.

At first, the combustion chamber 3 is provided with, in addition to the air compressed by the compressor 2, the fuel relatively low in corrosiveness such as lamp oil and LNG containing 1.5 weight % or less of sulfur from the fuel tank 21. The combustion gas which is obtained at the combustion chamber 3 and less corrosive, that is, the combustion gas containing sulfur oxide ($SO_x$) of 100 ppm or less, is sent to the first stage 16a of the gas turbine 16, then sent to the second stage 16b, thereby each rotor blade of the first and the second stage 16a, 16b being made to rotate.

The combustion gas undergone the second stage 16b of the gas turbine 16 is, then, sent to the third stage 16c where, in addition to the combustion gas undergone the second stage 16b, the coal fired gas is sent from a fluidized bed boiler 22. The fluidized bed boiler 22 is provided with a mixture of coal and limestone from a tank 23, further provided with the compressed air drawn out from the midway of the compressor 2 to burn coal. After eliminating the ash content from the obtained gas with a cyclone 24, the gas is provided to the third stage 16c as the coal fired gas.

The third stage 16c and the fourth stage 16d are made to rotate by the mixture gas of the combustion gas such as LNG and the like undergone the second stage 16d and the coal fired gas from the fluidized bed boiler 23.

Now, the coal fired gas is a gas which contains the high concentration, such as exceeding 100 ppm, of sulfur oxide ($SO_x$) and tends to induce sulphidizing corrosion. However, as shown in FIG. 1, since the peak of the corrosion due to sulphidizing corrosion is located around 1,073° K., by setting the temperature of the gas turbine stages, that is, the stages after the third stage 16c including the third stage 16c, which use the coal fired gas, at below 1,073° K., the sulphidizing corrosion can be suppressed. However, different from the problem of the deposition of the ash content due to the vanadium corrosion suppressing agent, since the sulphidizing corrosion is a problem of the temperature itself of the high temperature member constituting the gas turbine 16, after the third stage 16c including the third stage, the material temperature of the rotor-stator blade (particularly the base temperature) should be regulated at below 1,073° K. Practically, it is preferable to set the material temperature of the rotor-stator blade after the third stage 16c including the same at below 1,023° K.

Thus, when the material temperatures of the third and the fourth stage 16c, 16d where the coal fired gas goes through are regulated at below 1,073° K., in addition to the reduction of the fuel cost due to the usage of the coal fired gas, the sulphidizing corrosion of the high temperature member due to sulfur content rich in the coal fired gas can be avoided. The life of the high temperature member can be drastically enhanced. Further, at the first and the second stage 16a, 16b disposed on the higher temperatures side where the high temperature corrosion due to sulfur is serious, by using the combustion gas less in the sulfur content such as the lamp oil and LNG, while avoiding sulphidizing corrosion, the thermal efficiency of the gas turbine apparatus can be improved.

Figure 6:
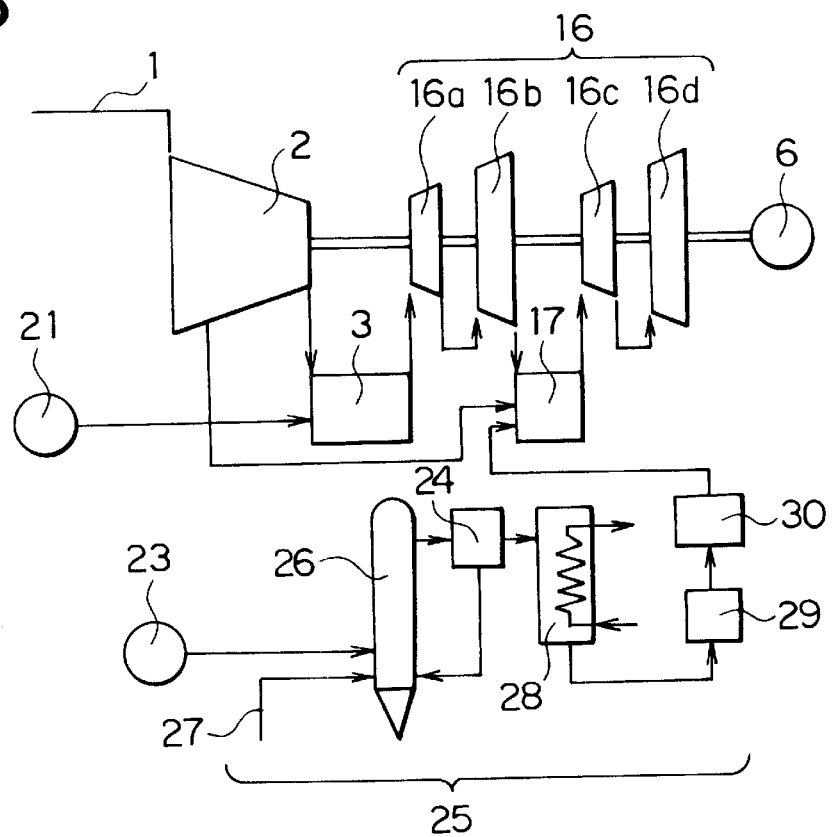
FIG. 6 is a diagram showing a construction of the first embodiment of the third gas turbine apparatus of the present invention.

FIG. 6 is a diagram showing a construction of the first embodiment of the third gas turbine apparatus of the present invention. The gas turbine apparatus shown in FIG. 6 is an example of the construction of a reheat cycle type gas turbine apparatus in which a coal gasification furnace is applied in the present invention.

The gas turbine apparatus shown in FIG. 6 possesses, as identical with the gas turbine apparatus shown in FIG. 4, in addition to the first stage of the combustion chamber 3 disposed preceding the first stage 16a of the gas turbine 16, a second reheater 17 disposed between the second stage 16b and the third stage 16c of the gas turbine 16. In addition, number of the stage of the gas turbine and number of the stage of the combustion chamber disposed posterior to each combustion chamber 3, 17 are appropriately determined as identical as the gas turbine apparatus shown in FIG. 4. In the reheat cycle type gas turbine apparatus described above, at first, the combustion chamber 3 is provided, as identical with the embodiment shown in FIG. 5, together with the supply of air compressed by the compressor 2, with the fuel relatively less in corrosiveness such as lamp oil and LNG including less than 1.5 weight % of sulfur from the fuel tank 21. The combustion gas which is obtained at the combustion chamber 3 and less corrosive, that is, the combustion gas containing 100 ppm or less of sulfur oxide ($SO_x$), is sent to the first stage 16a of the gas turbine 16, then sent to the second stage 16b, thereby each rotor blade of the first and the second stage being made to rotate.

The combustion gas undergone the second stage 16b of the gas turbine 16 is sent to the second stage of the reheater 17. The reheater 17 is provided with coal gas from coal gasification apparatus 25. In the coal gasification apparatus 25, the coal supplied from the tank 23 to a coal gasification furnace 26 reacts at the coal gasification furnace 26 under high temperature and high pressure condition with an oxidizing agent such as oxygen or air supplied from the gasification agent supplying pipe 27 to form the coal gas. The coal gas is, after being eliminated the ash content with cyclone 24, made to go through sequentially an exhaust heat recovery apparatus 28, a desulphurization apparatus 29, and a scrubber 30 to be supplied to the reheater 17.

The second stage of the reheater 17 is supplied with, together with the above described coal gas, compressed air drawn from the midway of the compressor 2 to fire the coal gas. The combustion gas of this coal gas, that is, the coal fired gas including exceeding 100 ppm of sulfur oxide ($SO_x$), is, after being joined with the combustion gas undergone the second stage 16b, sent to the third stage 16c that is a later stage, then to the fourth stage 16d, thereby each rotor blade of the third and the fourth stage 16c, 16d is made to rotate.

The stage temperatures at the third stage 16c and after the same of the gas turbine 16, which are provided with the coal fired gas, are, in order to suppress the sulphidizing corrosion as identical as the gas turbine apparatus shown in FIG. 5, regulated for the material temperature of the rotor-stator blade to be below 1,073° K.

Thus, when the material temperatures of the third and the fourth stage 16c, 16d where the combustion gas goes through are regulated below 1,073° K., the high temperature corrosion of the high temperature member due to sulfur content included rich in the coal fired gas can be avoided, the fuel cost reduction due to the usage of the coal fired gas and the enhancement of life of the high temperature member can be attained. Further, by employing the combustion gas of the fuel less in the sulfur content such as the lamp oil and the LNG in the gas turbine stage of the high temperature side where the high temperature corrosion is serious due to sulfur content, while avoiding the sulphidizing corrosion, the high temperature turbine stage can be used, thereby the thermal efficiency of the gas turbine apparatus can be enhanced.

Figure 7:
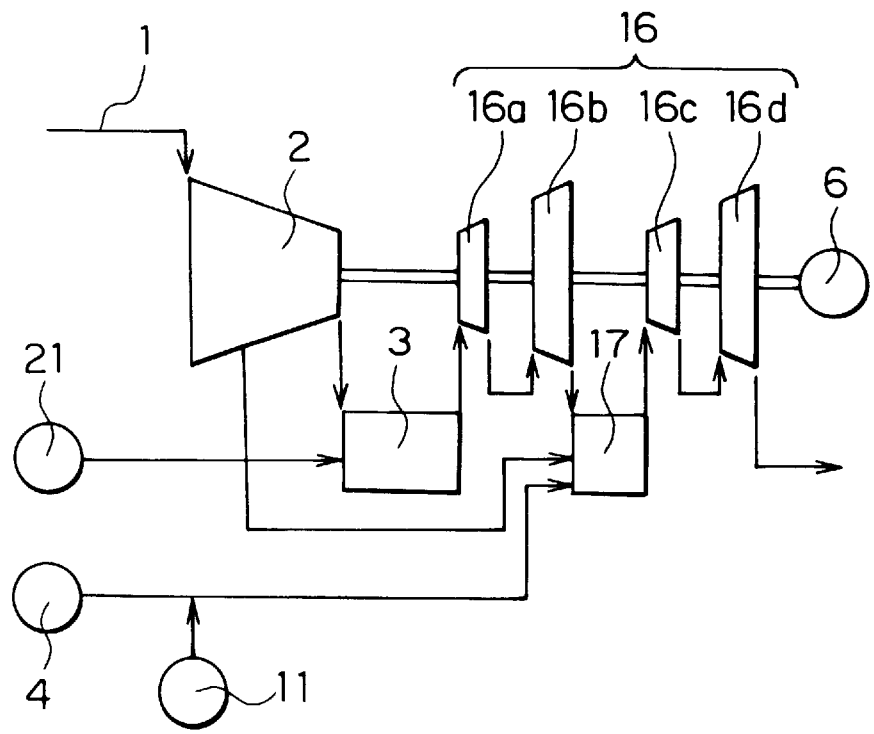
FIG. 7 is a diagram showing a construction of the second embodiment of the third gas turbine apparatus of the present invention.

FIG. 7 is a diagram showing a construction of the second embodiment of the third gas turbine apparatus of the present invention. The gas turbine apparatus shown in FIG. 7 possesses, as identical as the gas turbine apparatus shown in FIG. 6, in addition to the first stage of the combustion chamber 3, the second stage of the reheater 17 disposed between the second stage 16b and the third stage 16c of the gas turbine 16. To the first stage of the combustion chamber 3, the air compressed by the compressor 2 is supplied and the fuel relatively less in the corrosiveness such as the lamp oil and LNG containing less than 0.5 ppm of V is supplied from the fuel tank 21. The combustion gas which is obtained at the combustion chamber 3 and is less in its corrosiveness is sent to the first stage 16a of the gas turbine 16, then sent to the second stage 16b, thereby each rotor blade of the first and the second stage 16a, 16b being made to rotate.

Besides, the second stage of the reheater 17 is provided with the low quality oil fuel high in the corrosiveness such as the heavy oil and the residual oil, that is, the low quality oil fuel containing 0.5 ppm or more of V, from the fuel tank 4 after addition and mixing of the vanadium corrosion suppressing agent from the corrosion suppressing agent tank 11. To the reheater 17, further, the compressed air drawn from the midway of the compressor 2 is supplied. The combustion gas obtained by the reheater 17, that is, the combustion gas of the low quality oil fuel containing 0.5 ppm or more of V including the vanadium corrosion suppressing agent, is, after being joined with the combustion gas undergone the second stage 16b, sent to the third stage 16c and the fourth stage 16d, that are the later stages, sequentially, thereby each rotor blade of the third and the fourth stage 16c, 16d being made to rotate.

Figure 8:
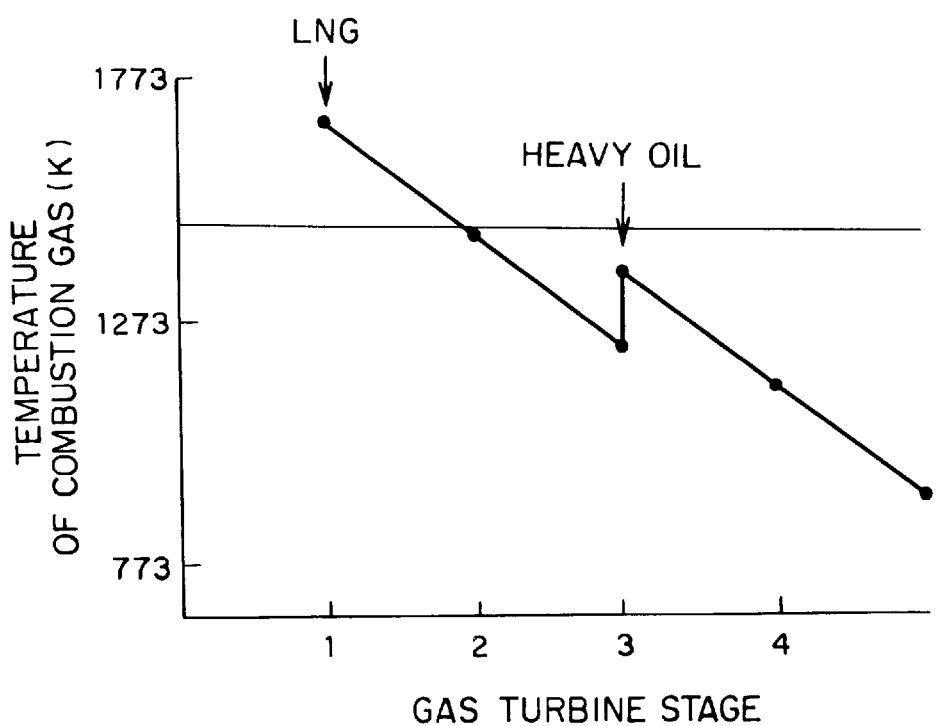
FIG. 8 is a diagram showing relationship between gas turbine stages in the gas turbine apparatus shown in FIG. 7 and combustion gas temperature.

FIG. 8 shows an example of relationship between each stage and the combustion gas temperature. Thus, by keeping the combustion gas temperatures of the third and the fourth stage 16a, 16b posterior to the reheater 17 at 1,458° K. or less, the vanadium corrosion of the high temperature member due to the low quality oil fuel can be avoided. Further, by utilizing the high temperature at the former stages, the first and the second stage 16a, 16b, the thermal efficiency of the system can be improved.

Figure 9:
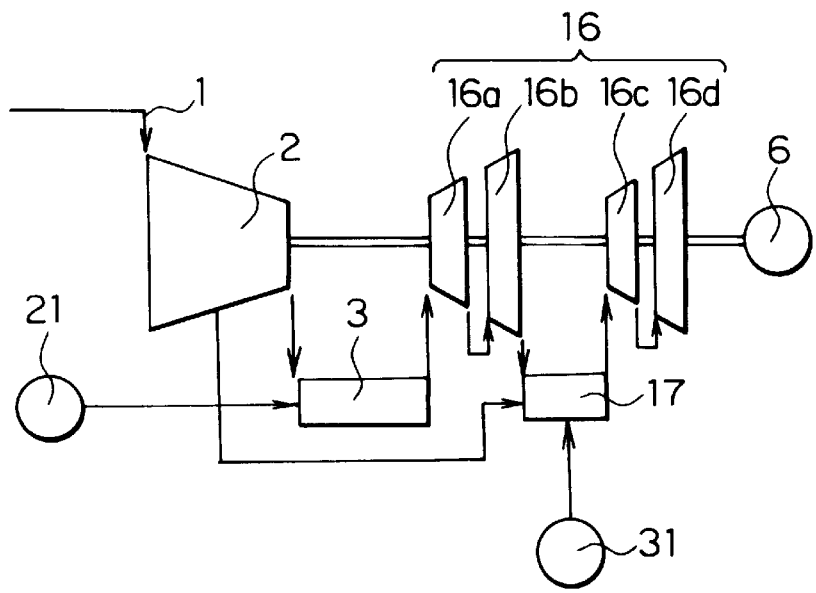
FIG. 9 is a diagram showing a construction of the third embodiment of the third gas turbine apparatus of the present invention.

FIG. 9 is a diagram showing a construction of the third embodiment of the third gas turbine apparatus of the present invention. The gas turbine apparatus shown in FIG. 9 possesses, as identical as the gas turbine apparatus shown in FIG. 6, in addition to the first stage of the combustion chamber 3, the second stage of the reheater 17 disposed between the second stage 16b and the third stage 16c of the gas turbine 16. To the first stage of the combustion chamber 3, the air compressed by the compressor 2 is supplied and the fuel such as the lamp oil and LNG relatively less in the corrosiveness and containing less than 1.5 weight % of sulfur is supplied from the fuel tank 21. The combustion gas which is obtained at the combustion chamber 3 and is less in its corrosiveness is sent to the first stage 16a of the gas turbine 16, then sent to the second stage 16b, thereby each rotor blade of the first and the second stage 16a, 16b being made to rotate.

Besides, the second stage of the reheater 17 is provided with, in addition to the low quality oil fuel high in the corrosiveness, such as the heavy oil and the residual oil, that is, the low quality oil fuel containing exceeding 1.5 weight % of sulfur, from the fuel tank 31, the compressed air drawn out of the midway of the compressor 2. The combustion gas obtained by the reheater 17, for example, the combustion gas of the low quality oil fuel containing exceeding 100 ppm of sulfur oxide ($SO_x$), is, after being joined with the combustion gas undergone the second stage 16b, sent to the third, posterior, stage 16c, then sent to the fourth stage 16d, thereby each rotor blade of the third and the fourth stage 16c, 16d being made to rotate.

Figure 10:
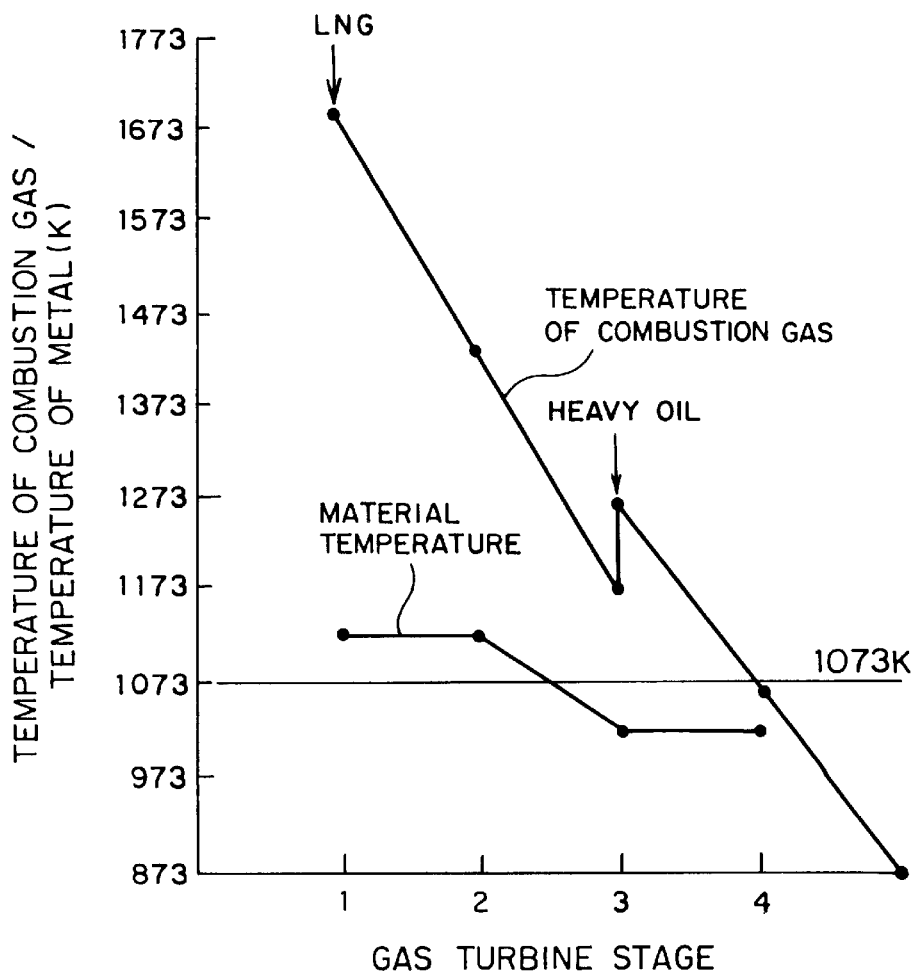
FIG. 10 is a diagram showing relationship between gas turbine stages in the gas turbine apparatus shown in FIG. 9 and temperature of combustion gas and material.

FIG. 10 shows an example of relationship between the combustion gas temperature of each stage and the material temperature. Thus, by maintaining the material temperature of the posterior stages to the reheater 17 below 1,073° K. due to improvement of cooling mechanism of the blade portion, the problem of the sulphidizing corrosion due to sulfur can be avoided. Further, by utilizing the high combustion gas temperature at the preceding stage to the reheater 17, the thermal efficiency of the system can be improved. In addition, the vanadium corrosion suppressing agent can be mixed with the fuel introduced to the reheater 17 from the fuel tank 31.

The corrosion problem of the rotor-stator of the gas turbine largely depends on the operating conditions and the fuel composition, by which the dominant phenomena of corrosion varies. Therefore, in a gas turbine apparatus the sulphidizing corrosion of which is serious, it is preferable to regulate the material temperature of the gas turbine stage posterior to the intermediate reheater at the temperature of less than 1,073° K. as shown in this embodiment. Besides, in a gas turbine apparatus the sulphidizing corrosion of which is not so serious, as the gas turbine apparatus shown in FIG. 7, it is preferable to regulate the combustion gas temperature at 1,458° K. or less.

Next, an embodiment of the still other gas turbine apparatus of the present invention will be explained.

Figure 11:
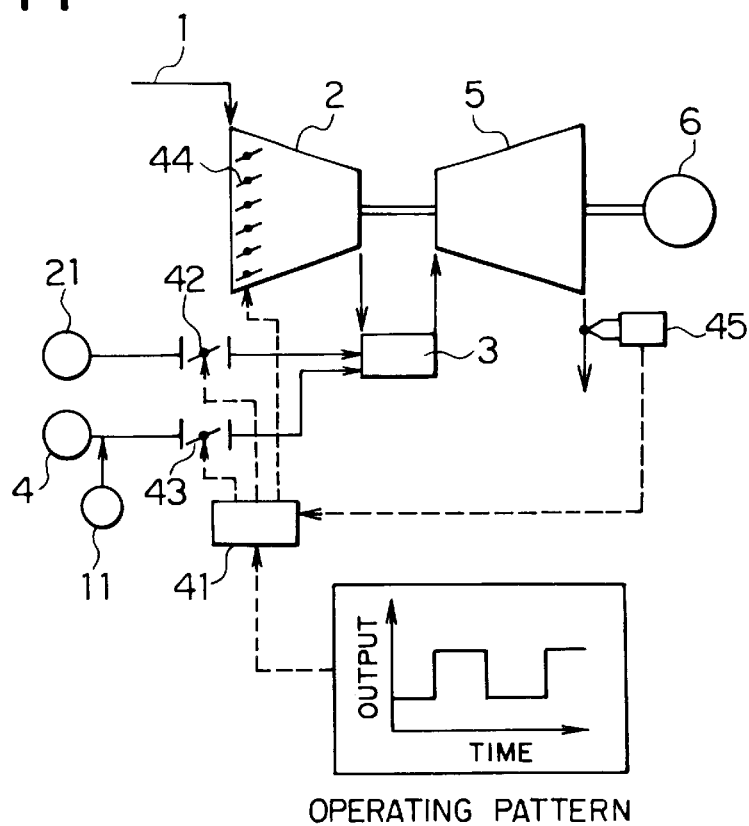
FIG. 11 is a diagram showing a construction of the first embodiment of the fourth gas turbine apparatus of the present invention.
Figure 12:
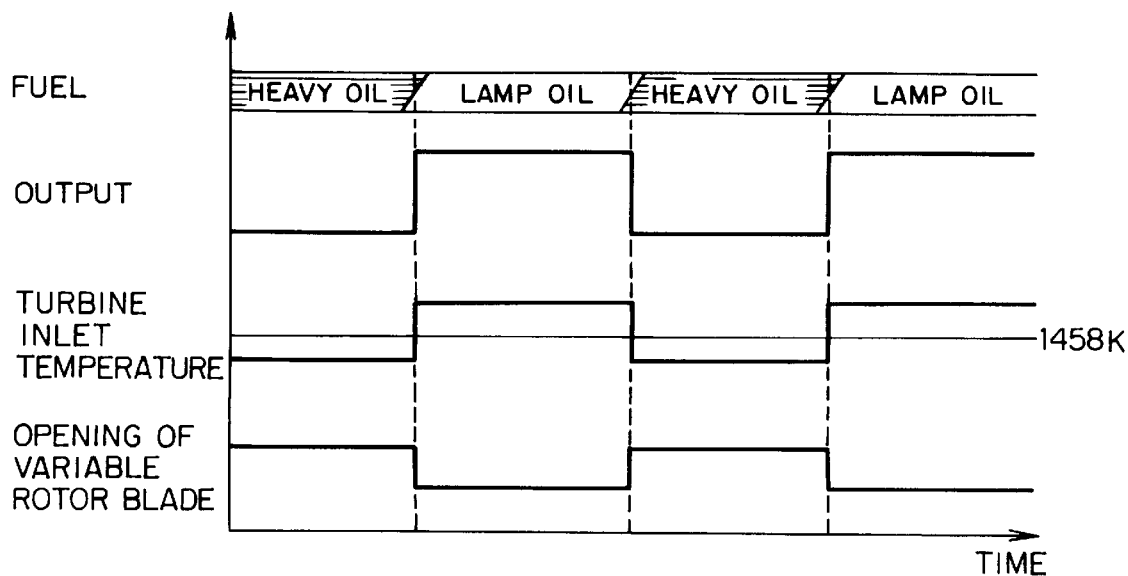
FIG. 12 is a diagram showing a typical operation pattern of the gas turbine apparatus shown in FIG. 11.

FIG. 11 is a diagram showing a construction of the fourth gas turbine apparatus of the present invention. In addition, in FIG. 12, a typical operation pattern of the gas turbine apparatus shown in FIG. 11 is shown.

The high quality fuel such as the lamp oil and the like stored in the high quality fuel tank 21, and, the fuel obtained by mixing the low quality fuel such as heavy oil and the like stored in the low quality fuel tank 4 and the corrosion suppressing agent such as $MgSO_4$ from the corrosion suppressing agent tank 11, are separately introduced to the combustion chamber through different routes. That is, the gas turbine apparatus possesses two systems for supplying fuel. Then, with the control signal transferred from the control circuit 41, the openings of the control valve of high quality fuel gas 42 and control valve of the low quality fuel gas 43 are controlled. Thereby, supply of the high quality fuel and the low quality fuel are interchanged therebetween.

Besides, coupled with the interchange of the fuels, air volume taken into the compressor 2 can be controlled by controlling the opening of the variable blades 44 disposed at the low pressure stage of the compressor. When the mode is set at the low quality oil mode, the opening is made to be large to increase an air flow rate, thereby the combustion temperature inside the combustion chamber 3 is controlled at below 1,458° K. The ash deposition problem at the high temperature stage due to the corrosion suppressing agent can be avoided. On the contrary, when the operating mode is set at the high quality oil mode, the opening of the variable blades 44 is made small to reduce the air flow rate, thereby the turbine inlet temperature is kept at 1,473° K. or higher. The turbine inlet temperature of 1,473° K. or higher reduces, together with the realization of the high thermal efficiency, the corrosiveness of the ash by evaporating chlorine and chlorides in the corrosive ash content deposited during the low quality oil mode.

Further, the combustion temperature is monitored with an exhaust gas thermometer 45 and this information is fed back to the control circuit 41. With such a control method, life and reliability of the gas turbine utilizing the low quality oil can be drastically enhanced. Further, since the optimum matching between the required output and fuel can be made to attain, from the view point of cost, the effect is remarkable.

Figure 13:
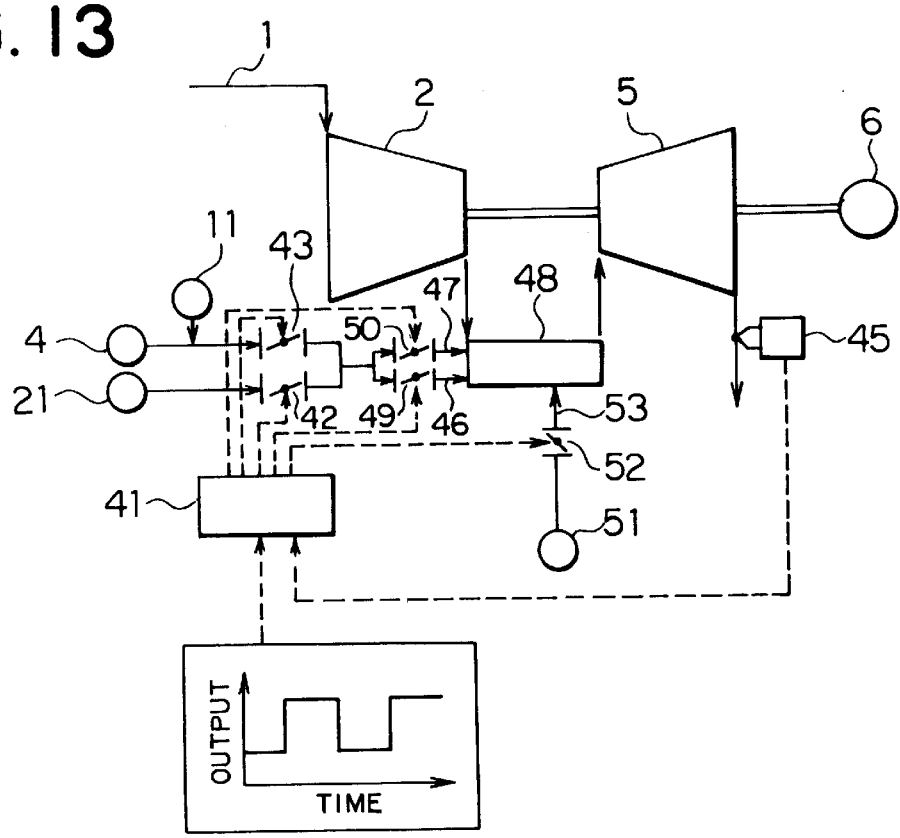
FIG. 13 is a diagram showing a construction of the second embodiment of the fourth gas turbine apparatus of the present invention.
Figure 14:
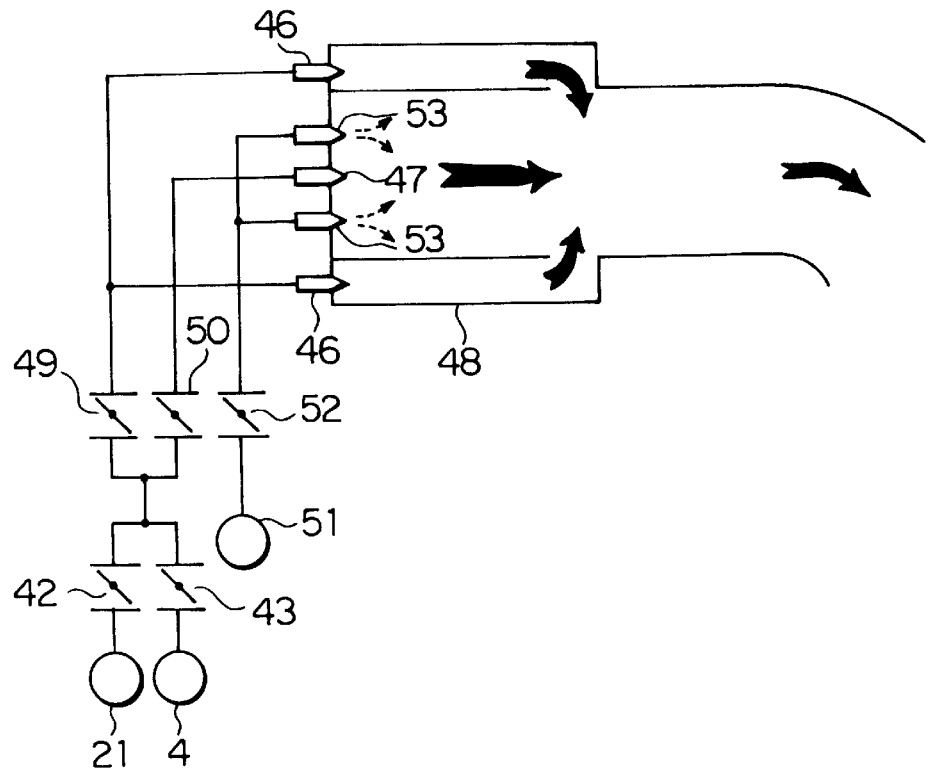
FIG. 14 is a diagram showing an example of a low $NO_x$ combustion chamber used in the gas turbine apparatus shown in FIG. 13.
Figure 15:
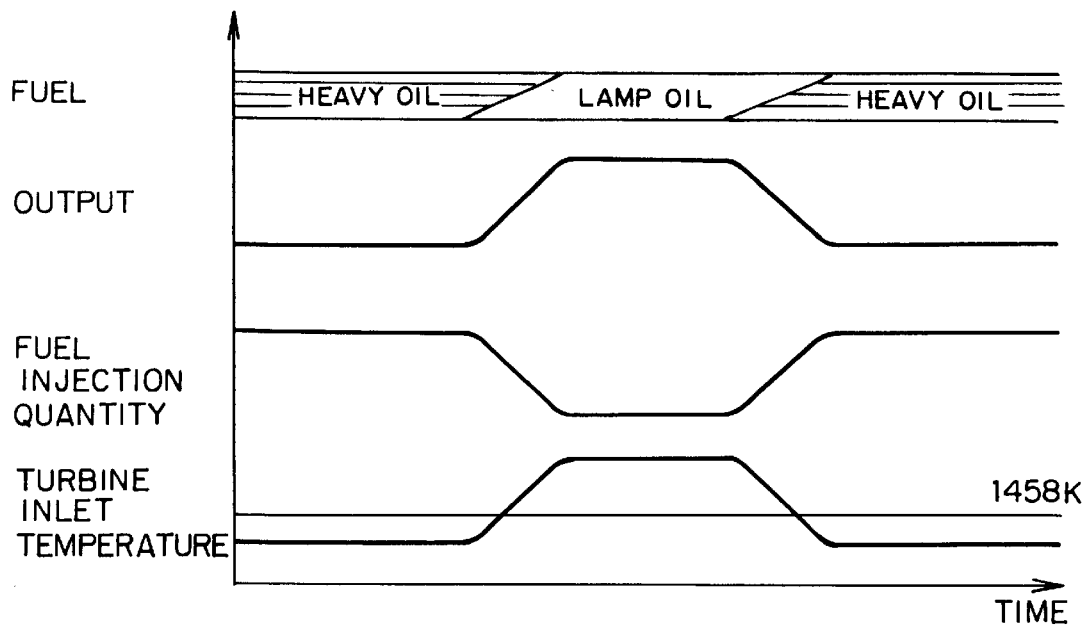
FIG. 15 is a diagram showing a typical operation pattern of the gas turbine apparatus shown in FIG. 13.

FIG. 13 is a diagram showing a construction of the second embodiment of the fourth gas turbine apparatus of the present invention. FIG. 14 shows an example of a dry type low $NO_x$ combustion chamber in a gas turbine apparatus of the present invention. FIG. 15 shows a typical operating pattern of the gas turbine apparatus of the embodiment.

The high quality oil such as lamp oil is stored in a high quality fuel tank 21 and the low quality oil such as heavy oil is stored in a low quality fuel tank 4, respectively. These respective fuels are, after being passed through the respective control valve 42, 43 to control their flow rate, joined and fed to a main fuel nozzle 46 and a pilot fuel nozzle 47 to be fired at the dry type low $NO_X$ combustion chamber 48. At this time, partition ratio between the main fuel and the pilot fuel can be controlled by a main fuel valve 49 and a pilot fuel valve 50.

When the low quality fuel is used, as shown in FIG. 14, water is supplied from a water injection nozzle 53 through a water injection control valve 52 from a water tank 51, and the combustion gas temperature is suppressed in its rise. Here, water introduced into the combustion chamber 48 can be vapor according to the necessity.

When the turbine inlet temperature during the low quality oil fuel mode is set at below 1,458° K. by implementing such system configuration and control, as identical as the above described embodiment, the life and reliability of the gas turbine can be drastically improved. In addition, the dry type low $NO_X$ combustion chamber 48 shown in FIG. 14, even when being operated at high combustion gas temperature mode with the high quality oil, can leads to suppression of $NO_X$ generation. Therefore, a clean gas turbine system under all operating conditions can be constructed.

Figure 16:
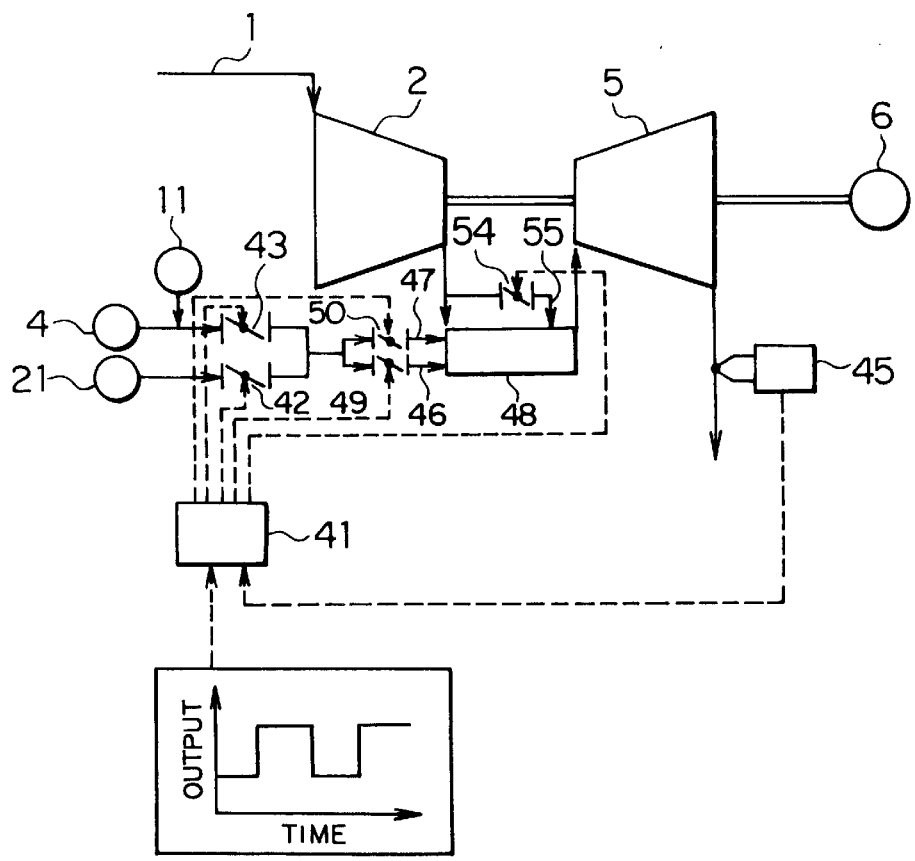
FIG. 16 is a diagram showing a construction of the third embodiment of the fourth gas turbine apparatus of the present invention.
Figure 17:
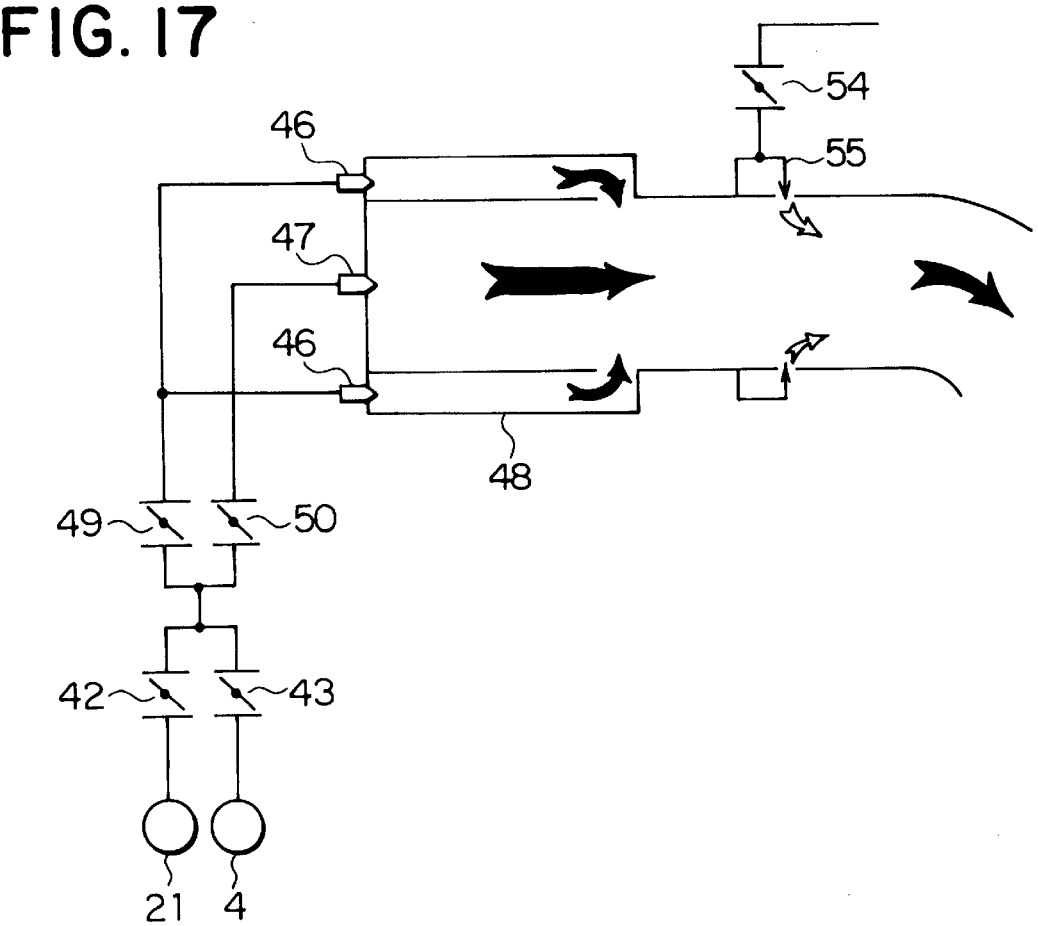
FIG. 17 is a diagram showing an example of a low $NO_X$ combustion chamber used in the gas turbine apparatus shown in FIG. 16.
Figure 18:
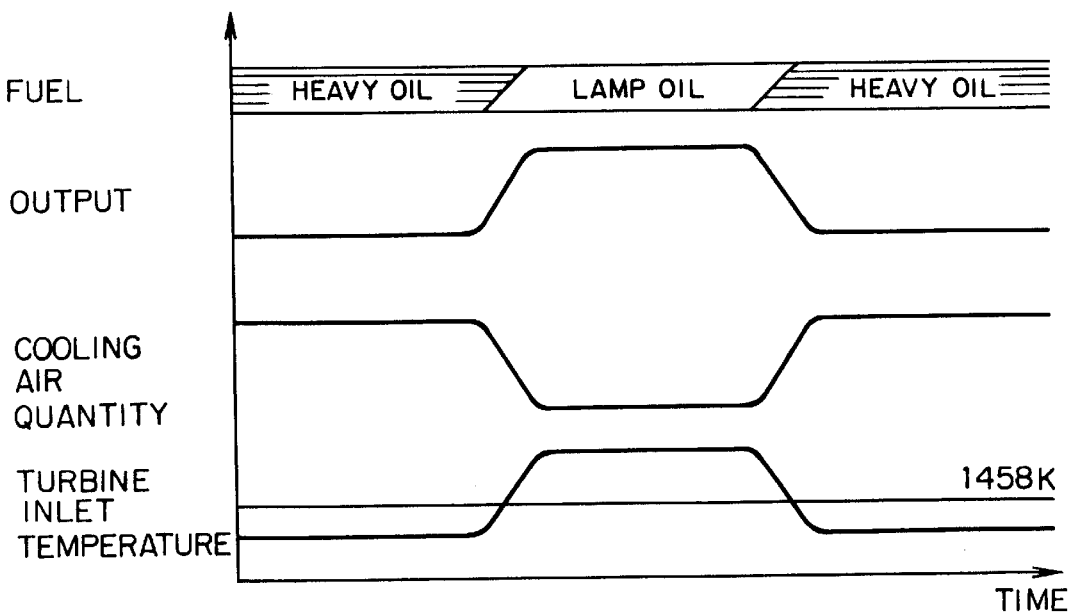
FIG. 18 is a diagram showing a typical operation pattern of the gas turbine apparatus shown in FIG. 16.

FIG. 16 is a diagram showing a construction of the third embodiment of the fourth gas turbine apparatus of the present invention. FIG. 17 is an example of a dry type low $NO_X$ combustion chamber in the gas turbine apparatus of the present invention. FIG. 18 shows a typical operation pattern of the gas turbine apparatus of this embodiment.

The high quality oil such as lamp oil is stored in a high quality fuel tank 21 and the low quality oil such as heavy oil is stored in a low quality fuel tank 4, respectively. These respective fuels are, after being passed through the respective control valve 42, 43 to control their flow rate, joined and fed to a main fuel nozzle 46 and a pilot fuel nozzle 47 to be fired at the dry type low $NO_X$ combustion chamber 48. At this time, partition ratio of the main fuel and the pilot fuel can be controlled by a main fuel valve 49 and a pilot fuel valve 50.

Besides, in the dry type low $NO_X$ combustion chamber 48, cold air is directly introduced from the cooling air inlet 55 through a flow rate control valve 54. The cooling air is supplied from a discharge outlet of the compressor 2. When the low quality oil such as heavy oil is used, the opening of a flow rate control valve 54 is raised to increase cooling air volume, thereby the combustion gas temperature is suppressed in rise.

When the turbine inlet temperature during the low quality oil fuel 100% mode is set at below 1,458° K. by implementing such system configuration and control, as identical as the above described embodiment, the life and reliability of the gas turbine can be drastically improved. In addition, the dry type low $NO_X$ combustion chamber 48 shown in FIG. 17, even when being operated at high combustion gas temperature mode with the high quality oil, can leads to reduction of generation of $NO_X$. Therefore, a clean gas turbine system under all operating conditions can be constructed.

As evident from the above embodiments, according to a gas turbine apparatus of the present invention, while suppressing the corrosion of the gas turbine member due to low quality oil such as heavy oil and residual oil, deposition of the ash content on the gas turbine member due to the corrosion suppressing agent can be reduced. Thereby, realization of long life of the gas turbine and prevention of the decrease of plant availability ratio due to frequent cleaning of the gas turbine can be made possible. Further, by varying the combustion gas property of each stage of the gas turbine according to the stage temperature, while preventing the vanadium corrosion and the sulphidizing corrosion of the gas turbine member due to combustion gas obtained from the fuel high in the corrosiveness such as the low quality oil such as heavy oil or residual oil and the coal gas, a gas turbine system of high temperature and high efficiency can be made possible.

What is claimed is:

1. A gas turbine apparatus, comprising:
   fuel containing 0.5 ppm or more of vanadium;
   a combustion chamber in which the fuel and compressed air are introduced and the fuel is fired;
   a mechanism projecting a vanadium corrosion suppressing agent in fuel combustion gas; and a gas turbine having a plurality of stages of a combination of rotor blades and stator blades which are rotated by the fuel combustion gas, the gas turbine having at least one stage of the combination of rotor blades and stator blades driven by fuel combustion gas not including the corrosion suppressing agent and at least one stage of the combination of rotor blades and stator blades driven by fuel combustion gas including the corrosion suppressing agent.

2. The gas turbine apparatus as set forth in claim 1:
wherein the combination of rotor blades and stator blades driven by the fuel combustion gas not including the corrosion suppressing agent is disposed upstream of the fuel combustion gas flow than the combination of rotor blades and stator blades driven by the fuel combustion gas including the corrosion suppressing agent.

3. The gas turbine apparatus as set forth in claim 1, further comprising:

a reheater disposed between the plurality of stages of the combination of rotor blades and stator blades, wherein the corrosion suppressing agent is projected in fuel which contains 0.5 ppm or more of the vanadium and is used at the reheater.

4. The gas turbine apparatus as set forth in claim 1, wherein the mechanism includes the vanadium corrosion agent in the fuel.

5. The gas turbine apparatus as set forth in claim 1, wherein temperature of the fuel combustion gas including the corrosion suppressing agent is less than 1,458° K.

6. The gas turbine apparatus as set forth in claim 1, wherein temperature of the fuel combustion gas not including the corrosion suppressing agent is 1,473° K. or more.

* * * * *

UNITED STATES PATENT AND TRADEMARK OFFICE
CERTIFICATE OF CORRECTION

PATENT NO.: 6,116,016

DATED: September 12, 2000

INVENTOR(S): Wada et al.

It is certified that an error appears in the above-identified patent and that said Letters Patent is hereby corrected as shown below:

Title page, Item [57], in the Abstract, line 2, change "rotor.stator" to --rotor·stator--; and Title page, Item [57], in the Abstract, line 3, change "rotor.stator" to --rotor·stator--.

Signed and Sealed this

Twenty-fourth Day of April, 2001

*Attest:*

NICHOLAS P. GODICI

*Attesting Officer*      *Acting Director of the United States Patent and Trademark Office*